United States Patent
Meister et al.

(10) Patent No.: US 9,722,800 B2
(45) Date of Patent: Aug. 1, 2017

(54) METHOD FOR CREATING A DERIVED ENTITY OF AN ORIGINAL DATA CARRIER

(71) Applicant: GIESECKE & DEVRIENT GMBH, Munich (DE)

(72) Inventors: Gisela Meister, Munich (DE); Jens Urmann, Heidelberg (DE)

(73) Assignee: Giesecke & Devrient GmbH, Munich (DE)

( * ) Notice: Subject to any disclaimer, the term of this patent is extended or adjusted under 35 U.S.C. 154(b) by 95 days.

(21) Appl. No.: 14/426,927

(22) PCT Filed: Jul. 22, 2013

(86) PCT No.: PCT/EP2013/002157
§ 371 (c)(1),
(2) Date: Mar. 9, 2015

(87) PCT Pub. No.: WO2014/037070
PCT Pub. Date: Mar. 13, 2014

(65) Prior Publication Data
US 2015/0236858 A1 Aug. 20, 2015

(30) Foreign Application Priority Data
Sep. 10, 2012 (DE) .......................... 10 2012 017 826

(51) Int. Cl.
*H04L 9/14* (2006.01)
*H04L 9/32* (2006.01)
*H04L 9/30* (2006.01)

(52) U.S. Cl.
CPC .............. *H04L 9/3263* (2013.01); *H04L 9/14* (2013.01); *H04L 9/30* (2013.01); *H04L 2209/24* (2013.01); *H04L 2209/64* (2013.01)

(58) Field of Classification Search
CPC .... H04L 9/14; H04L 2209/24; H04L 2209/64
See application file for complete search history.

(56) References Cited

U.S. PATENT DOCUMENTS

| | | | | |
|---|---|---|---|---|
| 5,515,441 A | * | 5/1996 | Faucher | H04L 9/3263 380/285 |
| 5,606,617 A | * | 2/1997 | Brands | H04L 9/3263 380/30 |

(Continued)

FOREIGN PATENT DOCUMENTS

| | | |
|---|---|---|
| DE | 102010035098 A1 | 2/2012 |
| EP | 1113617 A2 | 7/2001 |
| EP | 1389752 A2 | 2/2004 |

OTHER PUBLICATIONS

Dan Boneh, Schnorr Digital Signature Scheme, 2005, International Federation of Information Processing from Encyclopedia of Cryptography and Security pp. 541-542.*

(Continued)

*Primary Examiner* — Ellen Tran
(74) *Attorney, Agent, or Firm* — Workman Nydegger

(57) ABSTRACT

There is provided a method for creating an authentication entity derived from an original data carrier, wherein the original data carrier has a key pair that is individual to the original data carrier and comprises a public key and a secret key of the original data carrier, and a certificate for the public key of the original data carrier. The method comprises the following steps: deriving a secret key for the derived authentication entity from the secret key of the original data carrier by the original data carrier; forming derivation data for the derived authentication entity; transferring authentication data to the derived authentication entity, wherein the authentication data have the derivation data, the certificate of the public key of the original data carrier as well as a derived key pair which comprises the derived secret key and the public key of the original data carrier.

19 Claims, 5 Drawing Sheets

(56) References Cited

U.S. PATENT DOCUMENTS

| | | |
|---|---|---|
| 8,793,495 B2 | 7/2014 | Meister |
| 2007/0226793 A1* | 9/2007 | Tanabiki ............... H04L 9/0825 726/21 |
| 2009/0314831 A1 | 12/2009 | Pluss et al. |
| 2013/0151854 A1 | 6/2013 | Meister |

OTHER PUBLICATIONS

Mike Just, Schnorr Identification Scheme, 2005, International Federation of Information Processing from Encyclopedia of Cryptography and Security pp. 542-543.*
Manik Lal Das, Authentication Techniques, Aug. 2005, Kanwal Rekhi School of Information Technology, pp. 1-116.*
C. P. Schnorr, Efficient signature generation by smart cards, 1991, Journal of Cryptography International Association of Cryptographic Research, pp. 1-14.*
German Search Report for the corresponding German Application No. 102012017826.3, Apr. 23, 2013.
International Search Report for the corresponding International PCT Application No. PCT/EP2013/002157, Jan. 8, 2014.
Menezes et al., "The DSA and Related Signature Schemes," Handbook of Applied Cryptography, Chapter 11.5, 1997, pp. 451-462, CRC Press, Inc.
Tanenbaum et al, "Distributed Systems—Principles and Paradigms," Dec. 31, 2007, pp. 437-439, Pearson Prentice Hall, Upper Saddle River, NJ.

\* cited by examiner

METHOD FOR CREATING A DERIVED ENTITY OF AN ORIGINAL DATA CARRIER

BACKGROUND

This invention relates to a method for creating an entity derived from an original data carrier, to a corresponding original data carrier, and to an entity derived therefrom.

Portable data carriers are often employed as security documents, for example in the form of a national identity card, a passport, a signature card or the like. Modern security documents now often have a memory and a processor and are arranged for executing security applications. Examples of use for such security applications are authentication to a terminal, establishment of a secure data communication channel, electronic signing of data, and verifying signatures and the like. In this manner, such data carriers can be used for interacting with arbitrary service providers, in order for example to authenticate themselves for electronic transactions, e.g. over the Internet, and to carry them out in a secure manner. Further, the security documents can be used for storing data, such as e.g. personal and/or security-relevant data as well as other useful data, and support access control systems for example.

Loss or theft of such a portable data carrier can be very disadvantageous for the user. On the one hand, the user is then immediately restricted in his actions and, on the other hand, there is the danger of third parties utilizing the possibly stolen data carrier at least temporarily and in an unauthorized manner to the detriment of the proper authorized person. Further, there is also the danger of wear and tear for the proper user upon long-time employment of the data carrier in everyday life.

SUMMARY

The object of the present invention is to remedy the hereinabove disadvantages.

The invention is based on the approach of providing an entity derived from an original data carrier, for example a national identity card, by means of a method described in detail hereinafter. The creation of the derived entity is preferably monitored and certified by a trustworthy entity, for example a so-called "Trusted Service Manager". The derived entity can then be used by the user substantially instead of the original data carrier. That is to say, every transaction that was originally executable vis-à-vis a service provider by means of the original data carrier can now be effected by means of a derived entity. It is possible, and also intended, to respectively create different derived entities restricted to individual transactions or a small subset thereof for different transactions executable by means of the original data carrier.

According to a first aspect of the invention, there is provided a method for creating an authentication entity derived from an original data carrier, wherein the original data carrier has a key pair that is individual to the original data carrier and comprises a public key PKO and a secret key SKO of the original data carrier, and a certificate Cert(PKO) for the public key PKO of the original data carrier. The method comprises the following steps: deriving a secret key SKA for the derived authentication entity from the secret key SKO of the original data carrier by the original data carrier; forming derivation data for the derived authentication entity; transferring authentication data to the derived authentication entity, wherein the authentication data have the derivation data g1, Sig(g1), the certificate Cert(PKO) of the public key PKO of the original data carrier as well as a derived key pair which comprises the derived secret key SKA and the public key PKO of the original data carrier.

Preferably, the public key of the original data carrier is provided in the derived authentication entity in order to be treated as the public key PKO of the derived authentication entity within the context of an authentication with the derived authentication entity.

According to preferred embodiments, the key pair of the original data carrier is provided for an authentication according to a first authentication protocol, and the key pair of the derived authentication entity is provided for an authentication according to a derived authentication protocol in which unchanged steps of the first authentication protocol are executed with the public key PKO of the original data carrier.

Preferably, the method is characterized by the following further steps: reading data out of the original data carrier by a trustworthy entity after an authenticating of the original data carrier to the trustworthy entity; authenticating the derived authentication entity to the trustworthy entity while employing the transferred authentication data; and transferring the data read out of the original data carrier to the derived authentication entity by the trustworthy entity.

According to preferred embodiments, the original data carrier derives the secret key SKA for the derived authentication entity from the secret key SKO of the original data carrier while employing a random number RND1, preferably by multiplication by the random number RND1.

Preferably, the original data carrier determines a derivation parameter g1 and transfers it to the trustworthy entity, which forms at least a part of the derivation data g1, Sig(g1).

According to preferred embodiments, the original data carrier employs as a derivation parameter a derived base g1 which is formed by exponentiating the given base g by the reciprocal of the random number RND1 and transferred to the trustworthy entity, which is then a portion of the authentication data to be transferred to the derived authentication entity.

Preferably, the derivation data g1, Sig(g1) comprise a digital signature, preferably a Schnorr signature, of the derivation parameter g1.

According to preferred embodiments, the digital signature Sig(g1) is formed via the derivation parameter formed by the original data carrier, in the form of the derived base g1 while employing the secret key SKO of the original data carrier.

Preferably, the method is further characterized by the step, carried out within the context of authenticating the derived authentication entity to an authentication partner, of agreeing on a communication key KKI, KKA between the derived authentication entity and the authentication partner, preferably by means of a Diffie-Hellman key exchange method, on the basis of the public key PKO and the secret key SKA of the derived authentication entity as well as a public session key PKI and a secret session key SKI of the authentication partner, wherein the public session key PKI of the trustworthy entity is determined by exponentiating the derivation parameter g1 by the secret session key SKI of the authentication partner.

According to preferred embodiments, the method is further characterized by the step, carried out within the context of authenticating the original data carrier to the trustworthy entity, of agreeing on a communication key KKO, KKI between the original data carrier and the trustworthy entity, preferably by means of a Diffie-Hellman key exchange method, on the basis of the public key PKO and the secret key SKO of the original data carrier as well as a public session key PKI and a secret session key SKI of the trustworthy entity, wherein the public key PKO of the original data carrier is determined by exponentiating a given base g by the secret key SKO of the original data carrier, and the public session key PKI of the trustworthy entity is determined by exponentiating the given base g by the secret session key SKI of the trustworthy entity.

Preferably, for transferring the authentication data to the derived authentication entity, the original data carrier transfers the secret key SKA of the derived authentication entity to the trustworthy entity and the trustworthy entity then transfers the authentication data to the derived authentication entity.

According to preferred embodiments, the secret key SKA of the derived authentication entity is transferred in encrypted form and the original data carrier transfers the appurtenant decryption key RND2 directly to the derived authentication entity.

Preferably, for transferring the authentication data to the derived authentication entity, the trustworthy entity transfers the derivation data g1, Sig(g1) to the original data carrier and the original data carrier transfers the secret key SKA of the derived authentication entity and the derivation data g1, Sig(g1) to the derived authentication entity.

According to a second aspect of the invention, there is provided a method for authenticating an authentication entity to an authentication partner, preferably by means of a Diffie-Hellman key exchange method, on the basis of a public key PKO and a secret key SKA of the authentication entity as well as a public session key PKD and a secret session key SKD of the authentication partner, wherein the authentication entity is an authentication entity derived from an original data carrier, wherein the secret key SKA of the derived authentication entity is derived from a secret key SKO, individual to the data carrier, of the original data carrier by a derivation value RND1, the public key PKA of the derived authentication entity corresponds to the public key of the original data carrier, and the authentication entity makes available to the authentication partner a derivation parameter g1 formed from the derivation value, and the public session key PKD of the authentication partner is formed from the secret session key SKD and the derivation parameter g1.

Preferably, the secret key SKA of the derived authentication entity is formed by multiplying the secret key SKO of the original data carrier by a random number RND1 as a derivation value, and the public session key PKD of the authentication partner is determined by exponentiating a derived base g1 as a derivation parameter by the secret session key SKD of the authentication partner.

According to preferred embodiments, the method is further characterized by a step of agreeing on a communication key KKA, KKD between the derived authentication entity and the authentication partner.

According to a third aspect of the invention, there is provided a portable data carrier comprising a memory, a processor and a data communication interface for data communication with an external entity, characterized in that the data carrier is arranged for carrying out a method according to the first aspect of the invention for creating a derived authentication entity, in the role of the original data carrier together with a trustworthy entity arranged therefor.

According to a fourth aspect of the invention, there is provided a portable data carrier comprising a memory, a processor and a data communication interface for data communication with an external entity, characterized in that an authentication entity derived from an original data carrier has been created on the portable data carrier within the context of a method according to the first aspect of the invention.

According to a fifth aspect of the invention, there is provided an end device comprising a memory, a processor and a data communication interface for data communication with an external entity, characterized in that an authentication entity derived from an original data carrier has been created in a virtual data carrier on the end device within the context of a method according to the first aspect of the invention.

BRIEF DESCRIPTION OF THE DRAWINGS

Further features, advantages and objects of the invention will emerge from the following detailed description of several exemplary embodiments and alternative embodiments. Reference is made to the drawings, in which there are shown.

DETAILED DESCRIPTION OF VARIOUS EMBODIMENTS

Figure 1:
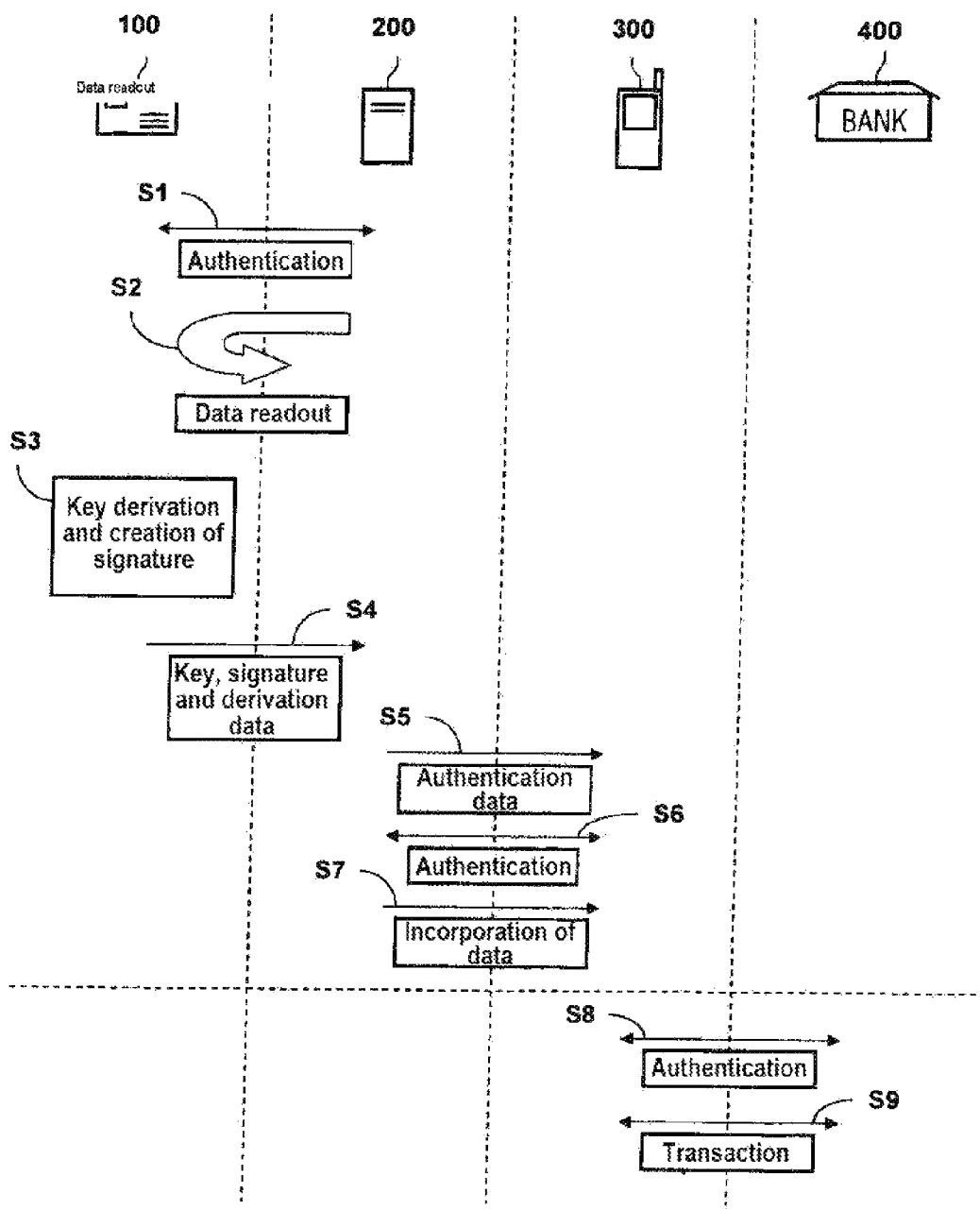
FIG. 1 an overview of essential steps of a preferred embodiment of a method according to the invention for producing and operating a data carrier derived from an original data carrier.

Hereinafter a preferred embodiment of a method for producing a data carrier derived from an original data carrier will be described.

As an original data carrier there can be employed an arbitrary security document having a certain minimum configuration with regard to the hardware, comprising a memory, a processor and a data communication interface for data communication with an external entity. Typical examples of an original data carrier for the purposes of the present invention are for example a national identity card with eID functionality, a passport, a signature card and the like.

The derived data carrier, which should have the same basic minimum hardware as the original data carrier, can be produced for example on the basis of a usual chip card or a similarly adapted portable data carrier or token.

Alternatively, however, a mobile end device, e.g. a mobile radio end device, a smartphone, a tablet or the like, can also provide an accordingly arranged environment, preferably in the form of a secure region shielded from the usual operating system of the device, for example in the form of a so-called "Trusted Execution Environment" (TEE), in order to take up the objects, for example in the form of data, keys, certificates and applications, to be transferred from the original data carrier to the derived data carrier within the context of producing the—then virtual—derived data carrier. A suitable TEE is distributed for example by the company Trustonic.

The production method can be understood as a delegation method. In general, a delegation object is transferred or delegated by the original data carrier in the role of the delegator to the derived data carrier in the role of the delegatee under the supervision of a delegation manager.

Such a delegation object comprises those elements that the original data carrier requires to carry out transactions with a third entity. Such an entity can be for example an arbitrary service provider on the Internet, or a bank, a government agency, a company, etc. A stated transaction can accordingly be for example a purchase on the Internet, opening a portfolio, filing a tax return, admission to a building and the like. Normally, each of said transactions requires an authentication of the original data carrier to the other party.

Normally, the functionality of the derived data carrier, after its completion, is restricted relative to the functionality of the original data carrier. A substantially identical copy is generally not intended, but in principle possible. A data carrier derived from the original data carrier is to be produced only for replacing the original data carrier for a certain time span, i.e. up to a given expiry date, for a certain task, for example for authentication with proof of age (i.e. as when using a national identity card).

It may be provided that the functionality temporarily delegated by the original data carrier to the derived data carrier is deactivated on the original data carrier itself during this time, i.e. between production of the derived data carrier and up to its expiry date, that is, as long as the derived data carrier can be employed instead of the original data carrier with regard to the delegated functionality. In the delegation process itself, corresponding access rights are accordingly changed temporarily in the original data carrier.

Preferably, a trustworthy entity, for example a so-called "Trusted Service Manager", will serve as a delegation manager. Such a delegation manager can be operated as an independent entity or else be attached to a special service provider. Normally, the trustworthy entity draws its authorization for monitoring a delegation process for producing a derived data carrier, as described hereinafter, from a certificate ultimately granted and verifiable by an appropriate public agency.

FIG. 1 represents the essential steps of a method for producing a derived data carrier 300 (S0 to S7) as well as the first steps (S8 and S9) of a method for employing said data carrier 300 vis-à-vis a service provider 400.

A holder of an original data carrier 100 wishes to produce a data carrier 300 derived from the original data carrier 100. For this purpose, a data communication is preferably employed between the original data carrier 100 and the trustworthy entity 200 serving as a delegation manager.

For this purpose, it may be necessary to connect the original data carrier 100 via a suitable reader (not shown) to an end device (not shown), for example a notebook or the like, which is for its part connected to the trustworthy entity 200, e.g. a server of said entity, via a suitable network (not shown), for example the Internet. Analogously, a data communication connection can be established between the derived data carrier 300 and the trustworthy entity 200 or a service provider 400. A data communication that might be necessary between the original data carrier 100 and the derived data carrier 300 (cf. FIG. 4, TS42) can also be effected directly, for example contactlessly via NFC ("near field communication") or via a local network (not shown).

To make the original data carrier 100 ready for operation for the method, a user authentication to the original data carrier 100 may be required. This can be effected for example by inputting a PIN.

Figure 2:
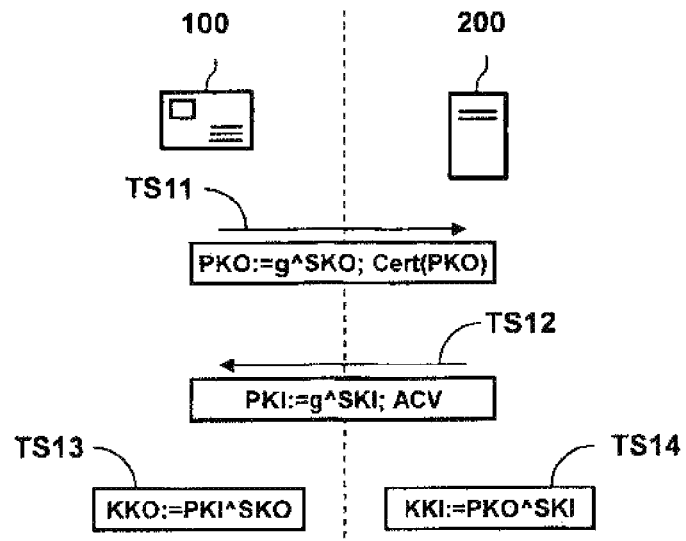
FIG. 2 essential steps of an authentication of the original data carrier to a trustworthy entity.
Figure 3:
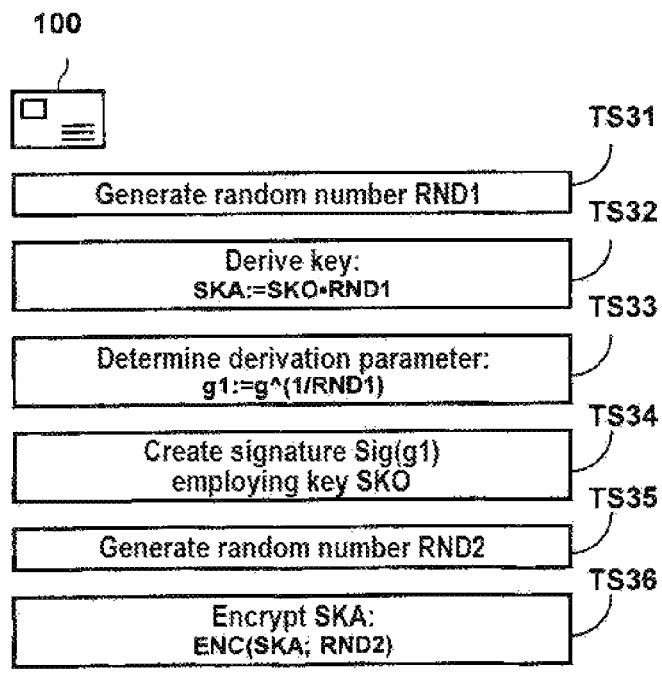
FIG. 3 steps to be carried out within the context of deriving and encrypting a secret key for the derived data carrier.

In step S1 the original data carrier 100 authenticates itself to the trustworthy entity 200. Essential steps of the authentication of the original data carrier 100 to the trustworthy entity 200 are represented in FIG. 2.

Both the original data carrier 100 and the trustworthy entity 200 respectively have a public and a secret key. The public key PKO of the original data carrier 100 is furnished with a key certificate Cert(PKO) which can be checked by the trustworthy entity 200. Within the context of the authentication a secret communication key KK is agreed on. Said key serves for encrypting the subsequent data communication and thereby securing it against being intercepted or changed.

In a first substep TS11 the original data carrier 100 transfers its public key PKO as well as the appurtenant certificate Cert(PKO) to the trustworthy entity 200. The latter in return transfers in substep TS12 its public key PKI as well as an authorization certificate ACV, to be described more precisely hereinafter, to the original data carrier 100. The respective public keys result, as stated in FIG. 2, by exponentiating a given base, a suitable primitive root g, by the respective secret key. Mathematical details are omitted here and hereinafter, such as for example a modular reduction of the exponentiation result modulo a suitably chosen prime number p which, like the base g, belongs to a set of process parameters known to both parties in advance. That is to say, for the original data carrier 100 it holds that PKO:=g^SKO, for the trustworthy entity it holds that PKI:=g^SKI.

In the substeps TS13 and TS14 the two parties respectively for their own part compute the communication key by exponentiating the public key respectively received from the other party by its own secret key. Both parties compute the same communication key KK=KKO=KKI in this manner, since it holds that $$KKO := PKI \wedge SKO$$
$$= (g \wedge SKI) \wedge SKO$$
$$= g \wedge (SKI \cdot SKO)$$
$$= g \wedge (SKO \cdot SKI)$$
$$= (g \wedge SKO) \wedge (SKI)$$
$$= PKO \wedge SKI$$
$$= : KKI$$

An authentication of the trustworthy entity 200 to the original data carrier 100 can be effected additionally and independently of the steps shown in FIG. 2, for example employing further suitable keys and by means of a challenge-response method.

After successful authentication the trustworthy entity 200 can now in step S2 read data out of the original data carrier 100, via the channel secured by means of the communication key KK. For this purpose, the trustworthy entity 200 presents the authorization certificate ACV to the original data carrier 100. Said certificate can have been signed by a public agency and proves the authorization of the trustworthy entity 200 to read data out of the original data carrier 100. After the original data carrier 100 has checked the certificate ACV, the trustworthy entity 200 can read out the data.

In step S3 the original data carrier 100 derives a secret key SKA for the derived data carrier 300. For this purpose, the original data carrier 100 generates a first random number RND1 in a first substep TS31.

The secret key SKA for the derived data carrier 300 results in substep TS32 as the product of the secret key SKO of the original data carrier 100 with the random number RND1, i.e. it holds that SKA:=SKO·RND1.

Figure 6:
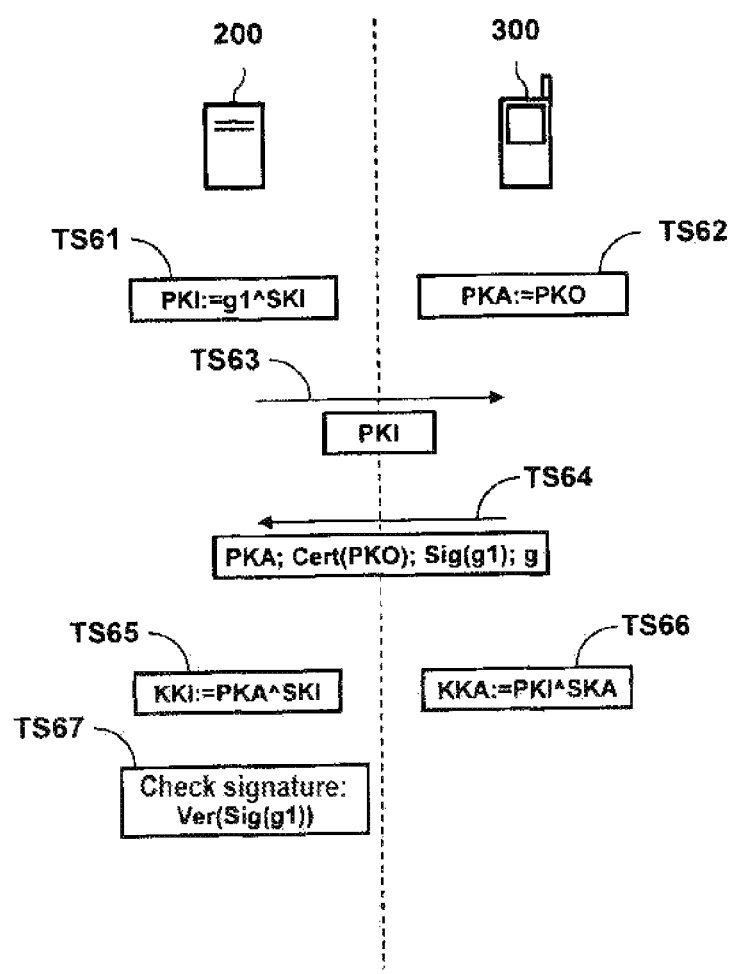
FIG. 6 essential steps of an authentication of the derived data carrier to the trustworthy entity, and FIG. 7 essential steps of an authentication of the derived data carrier to a service provider.
Figure 7:
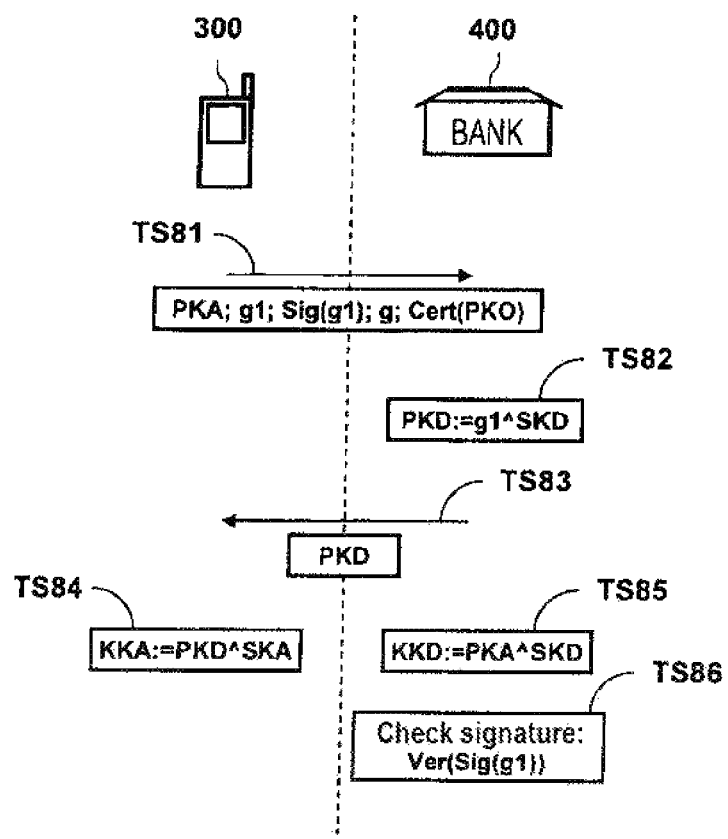

In a further substep TS33 the original data carrier 100 generates a derivation parameter g1, which makes the derivation of the secret key SKA reconstructable for the rest of the method and the other involved communication partners (cf. FIG. 6, TS71; FIG. 7, TS92), without making the secret key SKA public.

The derivation parameter is computed in the presently described example from the base g by exponentiating the latter by the reciprocal of the random number RND1. Here, too, the mathematical details known to the person skilled in the art are omitted, for example what a reciprocal is understood to be here and how it is formed and which modular reductions with which prime numbers are additionally required. A detailed description of (portions of) authentication methods on the basis of (modified) Diffie-Hellman methods as described here can be found for example in the draft European standard EN 14890-1 (STD version 2.2) in Annex C.6.1.

In a further substep TS34 a signature Sig(g1) of the derivation parameter g1 is generated by the original data carrier 100 while employing the secret key SKO of the original data carrier 100. According to a preferred embodiment of the invention, the Schnorr signature is employed here. As is known to the person skilled in the art, upon creation of the Schnorr signature of a data element M there is computed by the signer, who possesses a PKI key pair in the form of a public key PK and a secret key SK (with PK=g^SK), the value s=k−SK·e, where k is a random number from the residue class modulo p and it holds that e=H(M∥r). H stands for a suitable hash function and M∥r for the concatenation of the data element M to be signed with the value r=g^k. Further details on the Schnorr signature as well as on further signing methods suitable according to the invention, such as for example DSA, ElGamal and the like, can be taken for example from section 11, and in particular section 11.5, of the book "Handbook of Applied Cryptography" by A. Menezes, P. van Oorschot and S. Vanstone, 1997, to which reference is hereby made to the full extent.

If the signing method chosen is the Schnorr signature preferred according to the present invention, the following value results for the signature Sig(g1): Sig(g1)=(1/RND1)−SKO·H(g1). The random number k chosen here for the Schnorr signature was the inverse of the random number RND1, i.e. 1/RND1, which yields for the value r=g^k=g^(1/RND1)=g1, provided that, as preferred here, the data element M to be signed in the general case of the Schnorr signature is omitted. As can be readily recognized, the secret key SKO of the original data carrier 100 is incorporated into the computation of the Schnorr signature.

After the substeps TS32 to TS34 the random number RND1 can be deleted from the original data carrier 100.

The further substeps TS35 and TS36 show optional method steps for encrypting the derived key SKA before the latter (cf. FIG. 1, step S4) is transferred to the trustworthy entity 200. Preferably, the original data carrier 100 generates for this purpose a second random number RND2 as an encryption parameter (TS35) and encrypts the key SKA using the encryption parameter RND2 in TS36. This can be effected for example by XORing the key SKA and the encryption parameter RND2.

However, such an encryption of the key SKA can also be omitted. This holds in particular since the data communication channel between the original data carrier 100 and the trustworthy entity 200 is secured by means of the previously negotiated communication key KK, and the trustworthy entity 200 can be virtually ruled out as a source of corruption of the derived data carrier 300 due to its position and role in the overall system.

Figure 4:
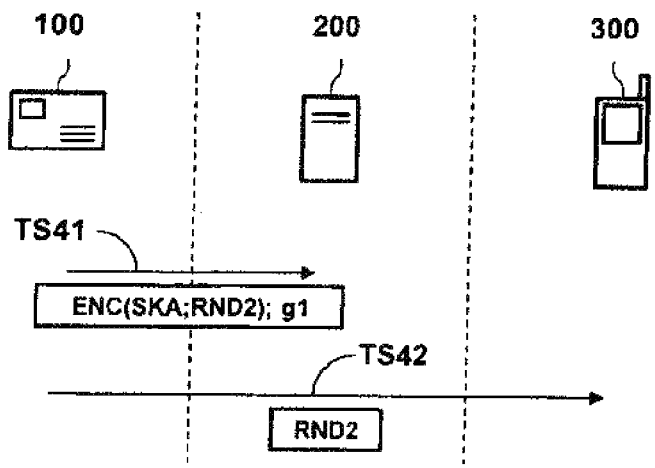
FIG. 4 steps for transferring the derived key.

As represented in FIG. 4, the derived key SKA encrypted by means of RND2 is transferred together with the derivation parameter g1, which can also be encrypted, where applicable, from the original data carrier 100 to the trustworthy entity 200 in substep TS41. In a further substep TS42 the original data carrier 100 transfers the encryption parameter RND2 to the derived data carrier 300. This is done via a separate data communication channel, which is preferably likewise secured in a suitable manner.

Figure 5:
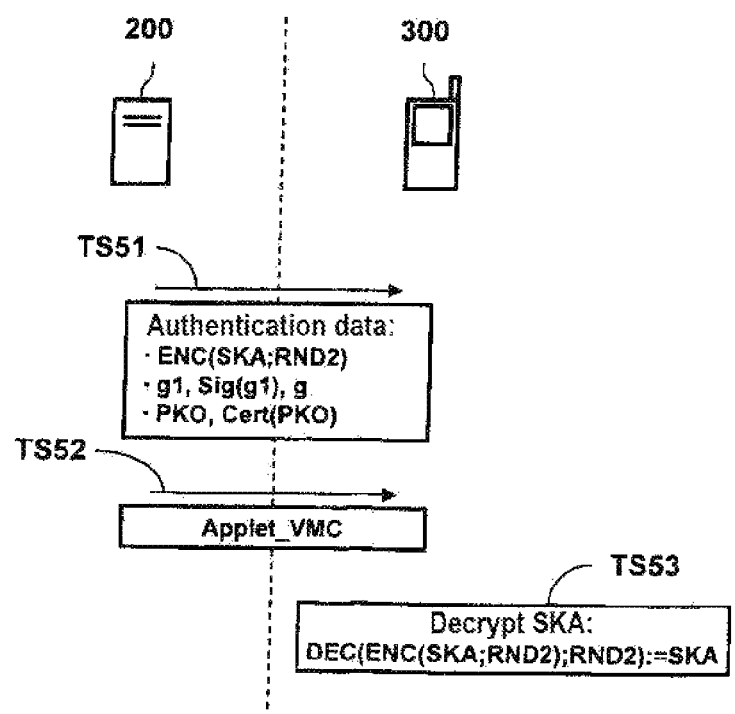
FIG. 5 steps for preparing the derived data carrier.

In step S5 of FIG. 1 or substep TS51 of FIG. 5, authentication data are transferred from the trustworthy entity 200 to the derived data carrier 300. In the described preferred embodiment, the authentication data comprise the (encrypted) secret key SKA of the derived data carrier 300, the appurtenant derivation parameter g1 (likewise encrypted, where applicable) and the signature thereof Sig(g1), the base g, the public key PKO of the original data carrier as well as the key certificate Cert(PKO) associated therewith. The base g from which the derivation parameter g1 results can be part of the certificate Cert(PKO), for example when the certificate is one according to the standard X.509.

In a substep TS52, which is in principle independent of the transfer of the authentication data 310, and can also be effected at a suitable different, in particular earlier, point of time in the method, the trustworthy entity 200 transfers those basic functionalities and basic structures to the derived data carrier 300 that the latter requires to be able to be used instead of the original data carrier 100, and that are independent of the original data carrier 100. This relates for example to a file system, cryptographic functionalities, functionalities for data communication, portions of a minimal operating system, if not yet present, and the like. In FIG. 5 this has been collectively designated by the term "Applet_VMC", where VMC stands for "Virtual Mobile Card".

In substep TS53 the derived data carrier 300 decrypts the secret key SKA received in encrypted form with the authentication data, by means of the encryption parameter RND2 received in substep TS42 (cf. FIG. 4).

The authentication data can finally be stored on the part of the derived data carrier 300 in the memory areas provided therefor in the data carrier 300.

Essential steps of an authentication of the derived data carrier 300 to the trustworthy entity 200 that now follow in the course of the method are specified in FIG. 6. A comparison with the steps shown in FIG. 2, which describe an authentication of the original data carrier 100 to the trustworthy entity 200, shows a slight but essential deviation in the course of the protocol employed for agreeing on the communication key. In a usual Diffie-Hellman method as is illustrated in FIG. 2, each party's public key is respectively formed by exponentiating a given base (or primitive root) g by the respective appurtenant secret key (cf. FIG. 2, TS11, TS12).

In the derived variant of the Diffie-Hellman method shown with reference to FIG. 6 this is no longer the case. Now the respective public keys are respectively formed by exponentiating the derivation parameter g1 (instead of g) by the respective appurtenant secret key (cf. FIG. 6, TS61, TS62). The equality of the public key of the derived data carrier PKA with the public key PKO of the original data carrier 100 as stated in TS62 results as follows:

$$PKA := g1 \wedge (SKA)$$
$$= g \wedge (1/RND) \wedge (SKA)$$
$$= g \wedge ((1/RND) \cdot RND \cdot SKO)$$
$$= g \wedge (SKO)$$
$$= PKO.$$

The remaining course of the method as stated in the substeps TS63 to TS66 matches the method from FIG. 2. The public keys generated as described hereinabove are made available to the respective other party (cf. TS63, TS64). The public key PKA of the derived data carrier 300 can be verified on the part of the trustworthy entity 200 with reference to the key certificate Cert(PKO). For determining the communication key, the received public key of the other party is respectively exponentiated by one's own key (cf. TS65, TS66). A match of the thus determined communication keys results as follows. The derived data carrier 300 computes:

$$KKA := PKI \wedge SKA$$
$$= (g1 \wedge (SKI)) \wedge SKA$$
$$= (g \wedge (1/RND) \wedge (SKI)) \wedge SKA$$
$$= g \wedge ((1/RND) \cdot SKI \cdot -SKO \cdot RND)$$
$$= g \wedge (SKI \cdot SKO).$$

The trustworthy entity 200 for its part computes:

$$KKI := PKA \wedge SKI$$
$$= PKO \wedge SKI$$
$$= (g \wedge SKO) \wedge (SKI)$$
$$= g \wedge (SKI \cdot SKO)$$
$$= KKA.$$

In substep TS67, finally, the trustworthy entity 200 can check the signature Sig(g1) transferred within the context of the transfer of the authentication data in step S5 to the derived data carrier 300. In the preferred case of a Schnorr signature, the trustworthy entity 200 verifies the signature by checking that the value r=g^k=g^(1/RND1)=g1 described hereinabove within the context of the Schnorr signature is equal to the following value rv:

$$rv = g \wedge Sig(g1) \cdot PKO \wedge H(g1) \quad (def. \text{ of } Sig(g1))$$
$$= g \wedge ((1/RND1) - SKO \cdot H(g1)) \cdot PKO \wedge H(g1) \quad (def. \text{ of } PKO)$$
$$= g \wedge ((1/RND1) - SKO \cdot H(g1)) \cdot (g \wedge SKO) \wedge H(g1) \text{ (transformation)}$$
$$= g \wedge (1/RND1)$$
$$= g1$$

From the fact that the public key PKO of the original data carrier 100 as well as the base g are incorporated into the check of the signature Sig(g1) on the part of the trustworthy entity 200, it follows for the trustworthy entity 200 that the signature Sig(g1) has been generated by means of a matching secret key, i.e. by means of the secret key SKO of the original data carrier 100.

This completes the authentication of the derived data carrier 300 to the trustworthy entity 200.

If this operation has taken place successfully, the trustworthy entity now in step S7 transfers the data read out of the original data carrier 100 in step S2 to the derived data carrier 300. This completes the production of the derived data carrier 300, which can be used in normal operation, instead of the original data carrier 100. Such a use is finally illustrated with reference to FIG. 7.

A method for employing the derived data carrier 300 vis-à-vis a service provider 400 comprises authenticating the derived data carrier 300 to the service provider 400. For this purpose, the derived data carrier 300 employs the authentication data transferred to the derived data carrier 300 during production (cf. FIG. 5, TS51).

As a comparison of the substeps TS81 to TS85 from FIG. 7 with the substeps TS61 to TS66 in FIG. 6 shows, the authentication of the derived data carrier 300 to the service provider 400 preferably takes place analogously, i.e. according to the same protocol and employing the same authentication data, as the authentication of the derived data carrier 300 to the trustworthy entity 200. A communication key (KKA, KKD, cf. TS84; TS85) is agreed on between the derived data carrier 300 and the service provider 400 by means of the variant of the Diffie-Hellman key exchange method already described in detail with reference to FIG. 6. This is done on the basis of the public key PKA and the secret key SKA of the derived data carrier 300 as well as a public session key PKD and a secret session key SKD of the service provider 400. The public key PKA of the derived data carrier 300 has already been determined during the production of the derived data carrier 300 by exponentiating the derivation parameter g1 by the secret key SKA of the derived data carrier 300. The secret key SKA of the derived data carrier 300 resulted, likewise already during the production of the data carrier 300, by multiplying the secret key SKO of the original data carrier 100 by the random number RND1. Hence, the public key PKA of the derived data carrier 300 also matches the public key PKO of the original data carrier 100, as explained hereinabove. Thus, it is possible that the public key PKA of the derived data carrier 300 is furnished with the original key certificate Cert(PKO) of the public key PKO of the original data carrier 100 (cf. TS81). Preferably, the service provider 400 checks said certificate Cert(PKO) within the context of the authentication.

The public session key PKD of the service provider 400 is determined by exponentiating the derivation parameter g1 by the secret session key SKD of the service provider 400 (cf. TS82).

In a further step (cf. TS86) the service provider 400 verifies the signature Sig(g1) of the derivation parameter g1. In the preferred case of a Schnorr signature, the service provider 400 verifies the signature Sig(g1) by checking that the value r=g^k=g^(1/RND1)=g1 described hereinabove within the context of the Schnorr signature is equal to the following value rv:

$$rv = g\wedge Sig(g1) \cdot PKO\wedge H(g1) \qquad (def.\ of\ Sig(g1))$$
$$= g\wedge((1/RND1) - SKO \cdot H(g1)) \cdot PKO\wedge H(g1) \qquad (def.\ of\ PKO)$$
$$= g\wedge((1/RND1) - SKO \cdot H(g1)) \cdot (g\wedge SKO)\wedge H(g1) \quad (transformation)$$
$$= g\wedge(1/RND1)$$
$$= g1$$

From the fact that the public key PKO of the original data carrier 100 as well as the base g are incorporated into the check of the signature Sig(g1) on the part of the service provider 400, it follows for the service provider 400 that the signature Sig(g1) has been generated by means of a matching secret key, i.e. by means of the secret key SKO of the original data carrier 100.

Depending on the type of transaction that is to be carried out between the derived data carrier 300 and the service provider 400, a successful authentication can be followed by further steps, for example a readout of data from the derived data carrier 300 by the service provider 400, as is indicated in FIG. 1 by the step S9. For this purpose, the service provider 400 would then normally have to present a corresponding authorization certificate which could be checked by the derived data carrier 300 (cf. the analogous situation between trustworthy entity 200 and original data carrier 100 during the production of the derived data carrier 300; FIG. 2, TS12; transfer of the authorization certificate ACV by the trustworthy entity 200 to the original data carrier 100).

In the preferred embodiment described hereinabove, it was described that upon the creation of the signature the data element M to be signed is omitted and the derivation parameter g1 is only signed by a corresponding choice of the value r=g^k=g^(1/RND1)=g1. As will be described hereinafter by the again preferred example of the Schnorr signature, the data carrier 300 derived from the original data carrier 100, due to the authentication data available thereto, is able to sign a data element M and to have the signature Sig(M) checked by a service provider 400. For creating the Schnorr signature of a data element M, the derived data carrier 300 computes the following value Sig(M)=k−SKA·H(M∥g1^k), where k is a random number to be newly generated for each signature.

For verifying the signature of the data element M, the service provider 400 checks whether the value r=g 1 ^k is equal to the following value rv with e=H(M∥g1^k):

$$rv = g1\wedge Sig(M) \cdot PKO\wedge e$$
$$= g1\wedge(k - SKA \cdot e) \cdot PKO\wedge e$$
$$= (g\wedge(1/RND1))\wedge(k - SKA \cdot e) \cdot (g1\wedge SKA)\wedge e$$
$$= g\wedge((1/RND1) \cdot (k - SKA \cdot e) \cdot (g\wedge(1/RND1))\wedge(SKA \cdot e)$$
$$= g\wedge((1/RND1) \cdot k) \cdot g\wedge(SKA \cdot e - SKA \cdot e)$$
$$= g\wedge((1/RND1) \cdot k)$$
$$= g1\wedge k$$

If the check yields that the value rv=g1^Sig(M)·PKO^H (M∥g1^k) computed by the service provider 400 is equal to the value r=g1^k computed by the service provider 400, then the signature Sig(M) of the data element M created by the derived data carrier is verified. In other words, the present invention makes it possible for legally binding signatures to also be made by means of the derived data carrier.

The person skilled in the art will recognize that a great advantage of the invention consists in the fact that, due to the integrity of the derivation parameter g1 being verified by means of its signature Sig(g1), the hereinabove described method for creating a derived data carrier 300 on the basis of the original data carrier 100 can also be carried out for the most part without the interaction of the hereinabove described trustworthy entity 200. The person skilled in the art will consequently appreciate that the hereinabove described example involves a preferred embodiment of the invention.

The invention claimed is:

1. A method for creating an authentication entity derived from an original data carrier, the original data carrier comprising a portable data carrier with specialized hardware for executing secure applications, the derived authentication entity comprising a derived data carrier that is a portable data carrier, wherein the original data carrier has a key pair that is individual to the original data carrier and comprises a public key and a secret key of the original data carrier, and a certificate for the public key of the original data carrier, comprising the steps of:
    deriving a secret key for the derived authentication entity from the secret key of the original data carrier by the original data carrier;
    forming derivation data for the derived authentication entity;
    authenticating the original data carrier to a trustworthy entity, the trustworthy entity being a separate entity from the derived authentication entity and the original data carrier;
    reading data out of the original data carrier by the trustworthy entity upon determining that the original data carrier is authenticated to the trustworthy entity;
    authenticating the derived authentication entity to the trustworthy entity using the transferred authentication data; and
    the trustworthy entity transferring the authentication data read out of the original data carrier to the derived authentication entity, wherein the authentication data have the derivation data, the certificate of the public key of the original data carrier as well as a derived key pair which comprises the derived secret key and the public key of the original data carrier, the transferred authentication data allowing the derived authentication entity to perform a limited set of tasks that are a subset of those tasks performable by the original data carrier.

2. The method according to claim 1, wherein the public key of the original data carrier is provided in the derived authentication entity in order to be treated as the public key of the derived authentication entity within the context of an authentication with the derived authentication entity.

3. The method according to claim 1, wherein the key pair of the original data carrier is provided for an authentication according to a first authentication protocol, and the key pair of the derived authentication entity is provided for an authentication according to a derived authentication protocol in which unchanged steps of the first authentication protocol are executed with the public key of the original data carrier.

4. The method according to claim 1, wherein the original data carrier derives the secret key for the derived authentication entity from the secret key of the original data carrier while employing a random number by multiplication by the random number.

5. The method according to claim 1, wherein the original data carrier determines, and transfers to the trustworthy entity, a derivation parameter which forms at least a part of the derivation data.

6. The method according to claim 1, wherein the original data carrier employs as a derivation parameter a derived base which is formed by exponentiating the given base by the reciprocal of the random number and transferred to the trustworthy entity, which is then a portion of the authentication data to be transferred to the derived authentication entity.

7. The method according to either of claim 5, wherein the derivation data comprise a digital Schnorr signature of the derivation parameter.

8. The method according to claim 7, wherein the digital signature is formed via the derivation parameter formed by the original data carrier, in the form of the derived base while employing the secret key of the original data carrier.

9. The method according to claim 1, further comprising the step, carried out within the context of authenticating the derived authentication entity to an authentication partner, of agreeing on a communication key between the derived authentication entity and the authentication partner by means of a Diffie-Hellman key exchange method, on the basis of the public key and the secret key of the derived authentication entity as well as a public session key and a secret session key of the authentication partner, wherein the public session key of the trustworthy entity is determined by exponentiating the derivation parameter by the secret session key of the authentication partner.

10. The method according to claim 1, further comprising the step, carried out within the context of authenticating the original data carrier to the trustworthy entity, of agreeing on a communication key between the original data carrier and the trustworthy entity by means of a Diffie-Hellman key exchange method, on the basis of the public key and the secret key of the original data carrier as well as a public session key and a secret session key of the trustworthy entity, wherein the public key of the original data carrier is determined by exponentiating a given base by the secret key of the original data carrier, and the public session key of the trustworthy entity is determined by exponentiating the given base by the secret session key of the trustworthy entity.

11. The method according to claim 1, wherein for transferring the authentication data to the derived authentication entity, the original data carrier transfers the secret key of the derived authentication entity to the trustworthy entity, and the trustworthy entity then transfers the authentication data to the derived authentication entity.

12. The method according to claim 11, wherein the secret key of the derived authentication entity is transferred in encrypted form, and the original data carrier transfers the appurtenant decryption key directly to the derived authentication entity.

13. The method according to claim 1, wherein for transferring the authentication data to the derived authentication entity, the trustworthy entity transfers the derivation data to the original data carrier, and the original data carrier transfers the secret key of the derived authentication entity and the derivation data to the derived authentication entity.

14. A portable data carrier, comprising a memory, a processor and a data communication interface for data communication with an external entity, wherein the data carrier is arranged for carrying out a method according to claim 1 for creating a derived authentication entity, in the role of the original data carrier together with a trustworthy entity arranged therefor.

15. A portable data carrier comprising a memory, a processor and a data communication interface for data communication with an external entity, wherein an authentication entity derived from an original data carrier has been created on the portable data carrier within the context of a method according to claim 1.

16. An end device comprising a memory, a processor and a data communication interface for data communication with an external entity, wherein an authentication entity derived from an original data carrier has been created in a virtual data carrier on the end device within the context of a method according to claim 1.

17. A method for authenticating an authentication entity to an authentication partner by means of a Diffie-Hellman key exchange method, on the basis of a public key and a secret key of the authentication entity as well as a public session key and a secret session key of the authentication partner;
   wherein the authentication entity is an authentication entity derived from an original data carrier, the original data carrier comprising a portable data carrier with specialized hardware for executing secure applications;
   wherein the original data carrier is authenticated to a trustworthy entity, the trustworthy entity being a separate entity from the derived authentication entity and the original data carrier, the trustworthy entity being configured to read data out of the original data carrier upon determining that the original data carrier is authenticated to the trustworthy entity, the derived authentication entity being authenticated to the trustworthy entity using the transferred authentication data, the transferred authentication data allowing the derived authentication entity to perform a limited set of tasks that are a subset of those tasks performable by the original data carrier;
   wherein the secret key of the derived authentication entity was derived from a secret key, individual to the data carrier, of the original data carrier by a derivation value, the public key of the derived authentication entity corresponds to the public key of the original data carrier, and the trustworthy entity makes available to the authentication partner a derivation parameter formed from the derivation value; and
   the public session key of the authentication partner is formed from the secret session key and the derivation parameter.

18. The method according to claim 17, wherein the secret key of the derived authentication entity is formed by multiplying the secret key of the original data carrier by a random number as a derivation value, and the public session key of the authentication partner is determined by exponentiating a derived base as a derivation parameter by the secret session key of the authentication partner.

19. The method according to claim 17, further comprising a step of agreeing on a communication key between the derived authentication entity and the authentication partner.

* * * * *